(12) United States Patent
Pease

(10) Patent No.: US 7,365,665 B2
(45) Date of Patent: Apr. 29, 2008

(54) PHOTODIODE DIGITIZER WITH FAST GAIN SWITCHING

(75) Inventor: John S. Pease, Mountain View, CA (US)

(73) Assignee: Bookham Technology PLC, Abington (GB)

( * ) Notice: Subject to any disclaimer, the term of this patent is extended or adjusted under 35 U.S.C. 154(b) by 0 days.

(21) Appl. No.: 11/644,518

(22) Filed: Dec. 22, 2006

(65) Prior Publication Data

US 2007/0152864 A1    Jul. 5, 2007

(51) Int. Cl.
*H03M 1/00*    (2006.01)
(52) U.S. Cl. ............... 341/139; 341/137; 341/155
(58) Field of Classification Search .......... 341/139
See application file for complete search history.

(56) References Cited

U.S. PATENT DOCUMENTS

| | | | |
|---|---|---|---|
| 5,422,643 A * | 6/1995 | Chu et al. ............... | 341/141 |
| 5,491,548 A * | 2/1996 | Bell et al. ............... | 356/73.1 |
| 5,894,527 A | 4/1999 | Endo | |
| 6,064,507 A * | 5/2000 | Heflinger et al. .......... | 359/237 |
| 6,627,867 B2 * | 9/2003 | Ames et al. ............ | 250/214 R |
| 7,092,644 B2 * | 8/2006 | Davidson ............... | 398/202 |

FOREIGN PATENT DOCUMENTS

| | | |
|---|---|---|
| EP | 1244218 | 9/2002 |
| GB | 2237465 | 5/1991 |
| JP | 2002-325037 | 11/2002 |
| WO | 87/06080 | 10/1987 |

OTHER PUBLICATIONS

International Search Report in Application No. GB0601996.2 mailed Apr. 27, 2006.
International Search Report in Application No. PCT/US2006/062618 mailed May 24, 2007.

* cited by examiner

*Primary Examiner*—Khai M. Nguyen
(74) *Attorney, Agent, or Firm*—Meyertons Hood Kivlin Kowert & Goetzel, P.C.; Erik A. Heter

(57) ABSTRACT

An optical receiver and method of operating therfor. A photodiode converts a received optical signal to an electrical signal, which is provided to both high gain and low gain signal paths. First analog-to-digital converter ADC) circuitry is coupled to convert a high gain output signal into a first plurality of digital signals, while second ADC circuitry converts a low gain output signal into a second plurality of digital signals. A control unit is configured to monitor the amplitude of at least one of the low gain and high gain output signals. If the amplitude of the monitored signal falls below a predetermined threshold, the control unit is configured to select data provided by the first ADC circuitry. Otherwise, data provided by the second ADC circuitry is selected.

18 Claims, 4 Drawing Sheets

PHOTODIODE DIGITIZER WITH FAST GAIN SWITCHING

BACKGROUND OF THE INVENTION

1. Field of the Invention

This invention relates to optical receivers, and more particularly, for conversion of optical signals into electrical signals.

2. Description of the Related Art

Optical systems are commonly used for the transmission of data signals. The high speed of optical signals allows for high information bandwidth. Thus, systems for transmitting and receiving optical signals can be found in many applications, such as computer networks and communications systems.

Information transmitted using optical signals is originated as information carried by electrical signals. These electrical signals are converted to optical signals and conveyed by an optical transmitter. The optical signals may then be received by an optical receiver and converted back into electrical signals for use in a system that recovers the transmitted information. This conversion of signals from electrical to optical and back to electrical again may introduce bottlenecks and other problems into systems based on optical signaling.

FIG. 1 is a block diagram of a portion of one embodiment of an optical receiver. In the embodiment shown, an optical signal may be received by a photodiode. The optical signal induces an electrical current through the photodiode, which may be received by the high gain amplifier path and the low gain amplifier path. Each of the high gain and low gain paths is coupled to a filter, which removes unwanted noise from its respective path. A switch couples one of the high gain or low gain paths to an analog-to-digital converter (ADC). The control unit is configured to monitor the signal levels on both signal paths and operate the switch to couple either the high gain or low gain signal path to the ADC. More particularly, the control unit is configured to couple the high gain path or the low gain path to the ADC depending on the signal amplitude, wherein the high gain path is used to amplify weak signals and the low gain path is used to amplify stronger signals. The control unit may operate the switch to couple the high gain path to the ADC if the amplitude of the output signal from the low gain path falls below a certain level, or couple the low gain path to the ADC if its amplitude exceeds this level.

Other types of receivers include a single amplifier with multiple feedback paths (wherein the switch selects a feedback path based on a signal level) or those that include a single filter, with the switch coupling either a high gain or low gain path to the filter.

These types of receiver may be subject to various problems. For example, when switching between the high gain and low gain paths in the embodiment of FIG. 1, the ADC may require settling time before a valid output can be produced. In an embodiment utilizing a single filter, switching may require settling time for the filter before a valid output is produced. In embodiments utilizing a single amplifier, switching may necessitate a settling time for the amplifier to produce a valid output.

Thus, in addition to any time lag induced by the control circuit in determining when to switch from one path to the other, settling times from amplifiers, filters, and/or an ADC may result in invalid data and can thus limit the speed at which the receiver may receive and accurately convert received optical signals into digital data signals. Another problem includes the possible presence of DC bias voltages on the photodiode, which can affect the accuracy of the data. Thus, the various problems of the optical receiver circuit shown in FIG. 1 and other embodiments described above may prevent it from being used in applications where data must be received and accurately converted into digital signals at very high speeds.

SUMMARY OF THE INVENTION

An optical receiver and method of operating therfor is disclosed. In one embodiment, a photodiode converts a received optical signal to an electrical signal, which is provided to both high gain and low gain signal paths. First analog-to-digital converter ADC) circuitry is coupled to convert a high gain output signal into a first plurality of digital signals, while second ADC circuitry converts a low gain output signal into a second plurality of digital signals. A control unit is configured to monitor the amplitude of at least one of the low gain and high gain output signals. If the amplitude of the monitored signal falls below a predetermined threshold, the control unit is configured to select data provided by the first ADC circuitry. Otherwise, data provided by the second ADC circuitry is selected.

In one embodiment, the amplitude of the low gain output signal is monitored by checking the digital signals provided by the second ADC circuitry. These digital signals provide an indication of the amplitude of the low gain output signal prior to conversion from analog to digital.

In various embodiments, the optical receiver includes an adaptive bias circuit configured to control the DC bias across the photodiode. The receiver may also include a compensating circuit coupled between the high gain and the low gain signal paths which causes the low gain output to be proportional to the current through the photodiode.

BRIEF DESCRIPTION OF THE DRAWINGS

Other aspects of the invention will become apparent upon reading the following detailed description and upon reference to the accompanying drawings in which.

Figure 1:
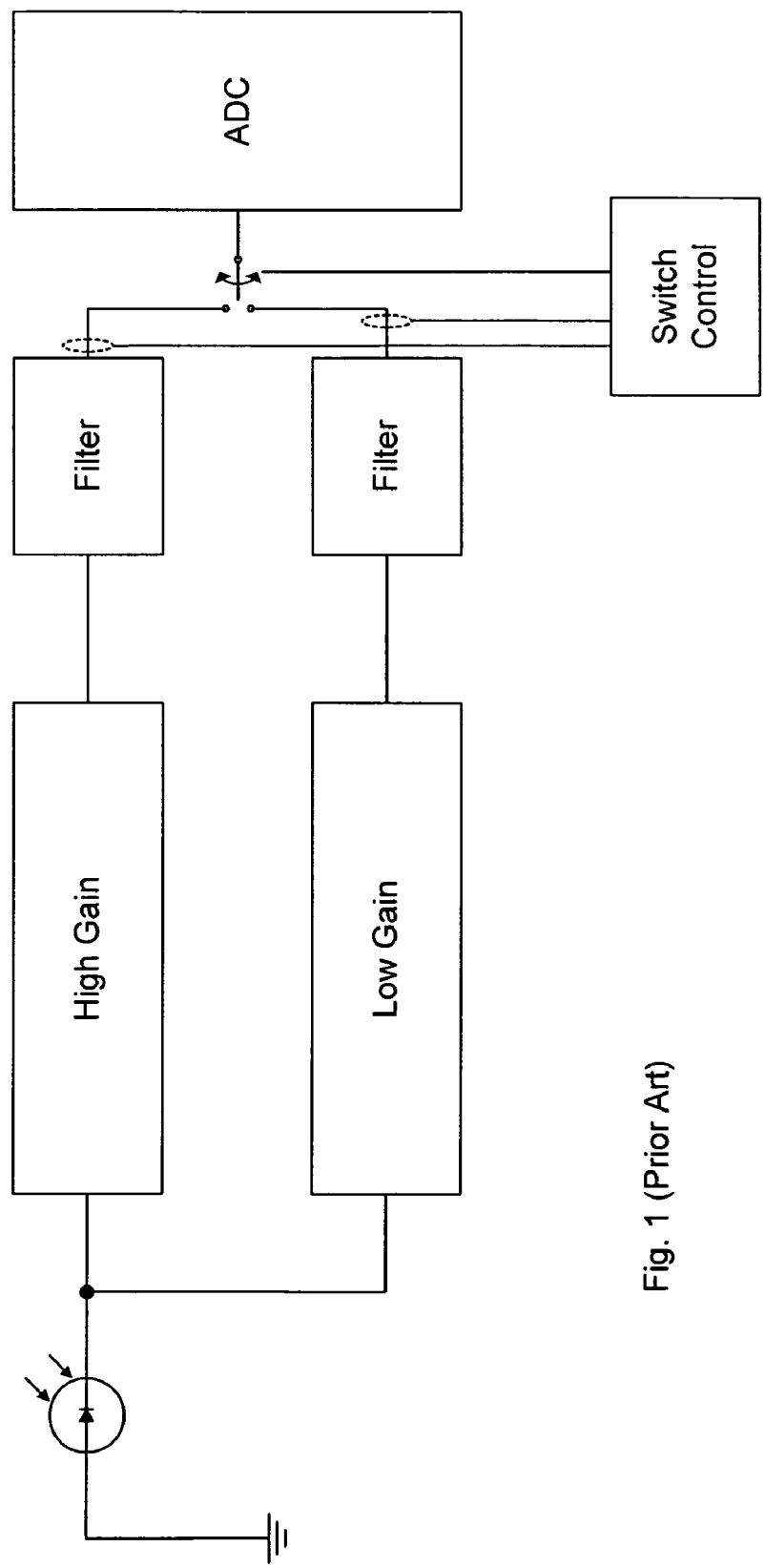
FIG. 1 (Prior Art) is a block diagram of a portion of one embodiment of an optical receiver circuit.

While the invention is susceptible to various modifications and alternative forms, specific embodiments thereof are shown by way of example in the drawings and will herein be described in detail. It should be understood, however, that the drawings and description thereto are not intended to limit the invention to the particular form disclosed, but, on the contrary, the invention is to cover all modifications, equivalents, and alternatives falling with the spirit and scope of the present invention as defined by the appended claims.

DETAILED DESCRIPTION OF THE INVENTION

Figure 2:
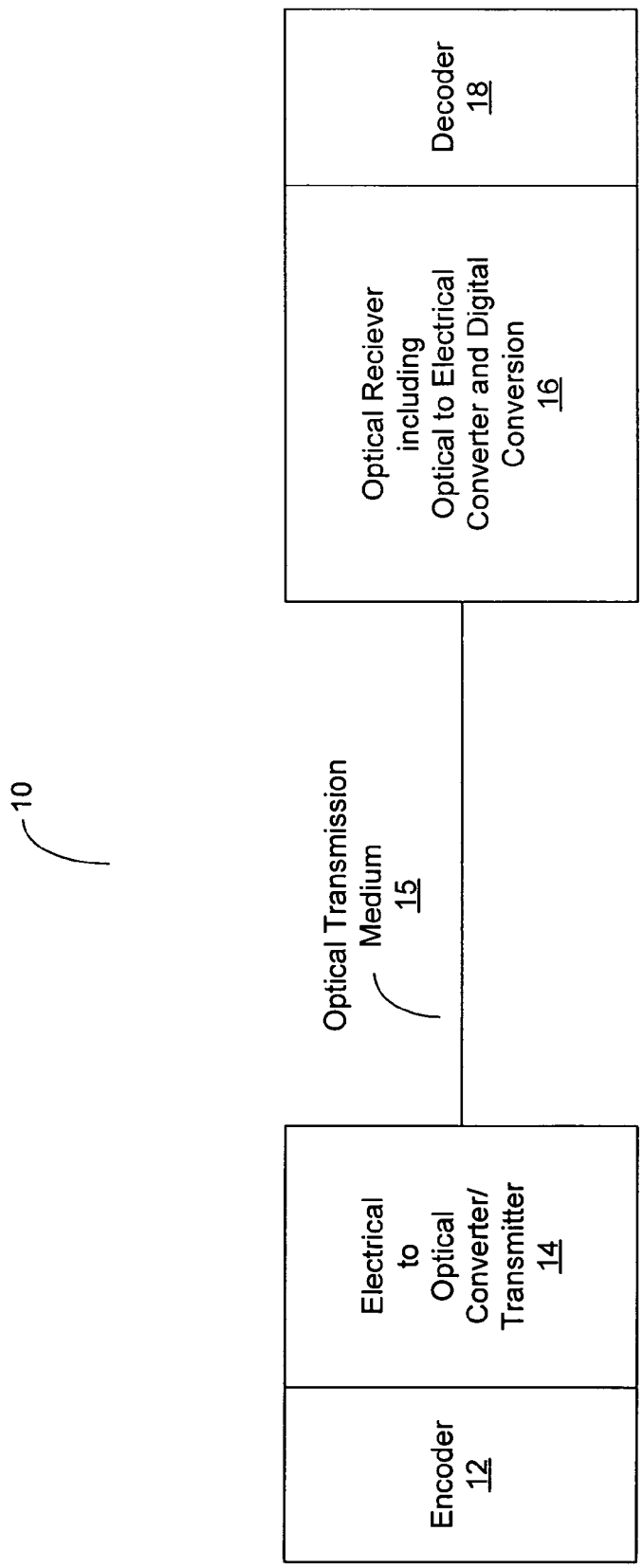
FIG. 2 is a block diagram of one embodiment of an optical communications system.

FIG. 2 is a block diagram of one embodiment of an optical communications system. In the embodiment shown, communications system 10 includes a transmission side having an encoder 12 and a transmitter 14. An optical transmission medium 15 couples transmitter 14 to optical receiver 16, which is in turn coupled to decoder 18. Optical transmission medium may be a fiber optic cable, free space, or any other suitable medium for conveying optical signals.

Encoder 12 is configured to encode information into a format for transmission. Transmission formats may include frame, packets, or other types of communication protocols. Once the information has been encoded, it is forwarded to transmitter 14, which also includes conversion circuitry. Digitally encoded information may first be converted into analog signals. These analog signals may then be converted into optical signals for transmission across optical transmission medium 15. A photodiode may be used to convert the electrical signals into optical signals.

The optical signals may be received from optical transmission medium 15 by optical receiver 16, an embodiment of which will be discussed in further detail below. A photodiode present in optical receiver 16 may convert the received optical signals into electrical signals. These electrical signals may be amplified in optical receiver 16, which may include both a high gain signal path and a low gain signal path. Following amplification, the electrical signals are converted from analog signals into digital signals. In one embodiment, separate analog-to-digital converters (ADCs) are used for signals on each of the high gain and the low gain signal paths. Depending on which of the signal paths is selected, digital signals from one of the ADCs are received by decoder 18, which then decodes the digital signals into a format suitable for output. Alternatively, separate decoders may be provided, with each decoder receiving digital data from corresponding ADC circuitry. Each decoder may decode its received digital data into a format suitable for output by communications system 10. Decoded data may be selected for outputting based on the selected signal path.

Figure 3:
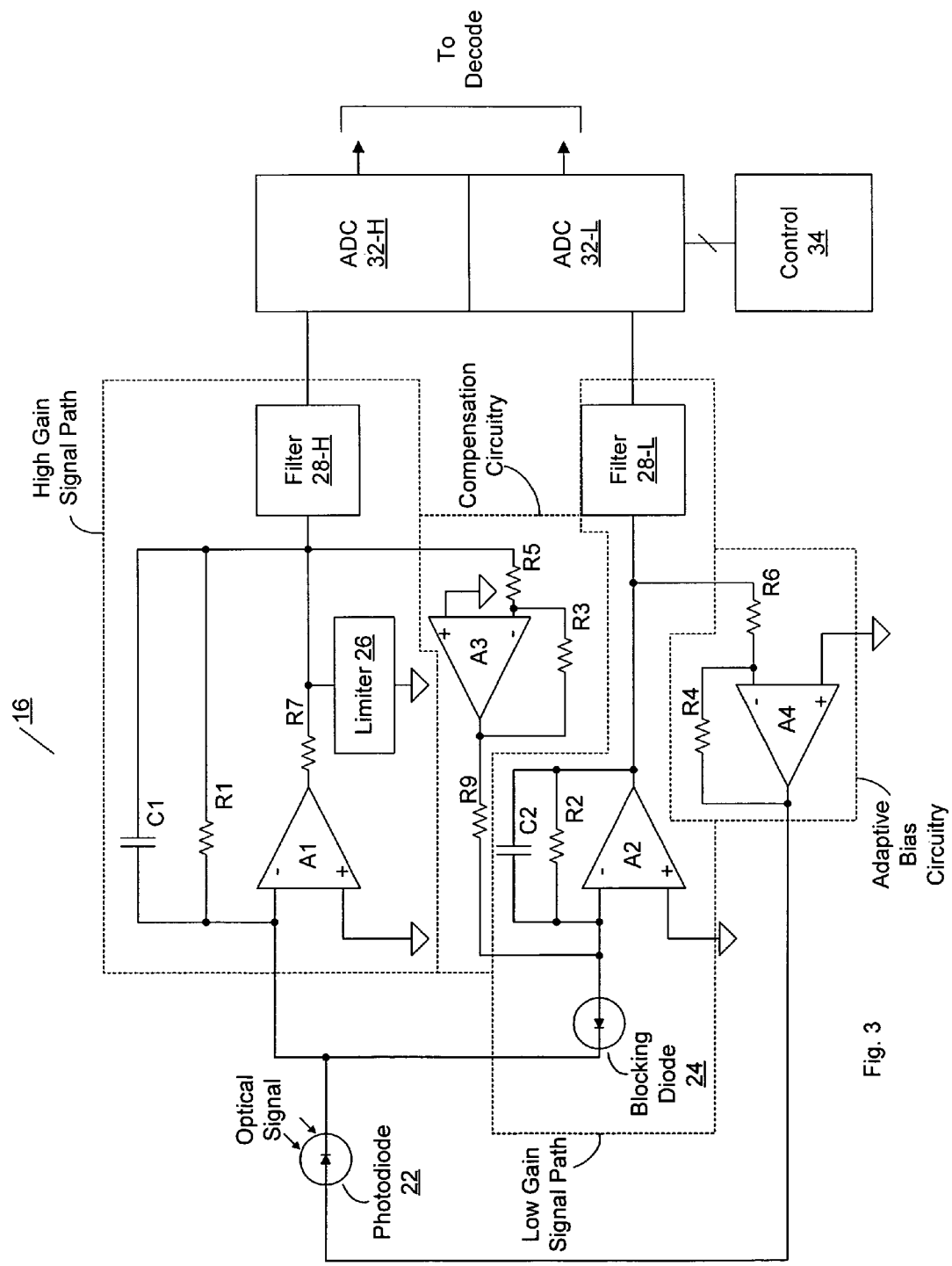
FIG. 3 is a schematic diagram of one embodiment of an optical receiver circuit configured to convert optical signals into analog electrical signals and subsequently into digital signals.

FIG. 3 is a schematic diagram of one embodiment of a circuit configured to convert optical signals into electrical signals. In the embodiment shown, optical receiver includes a high gain signal path (delineated by the dashed box including amplifier A1) and a low gain signal path (delineated by the dashed box including amplifier A2). A first ADC 32 is coupled to receive an output signal from the high gain signal path (a 'high gain output signal') and a second ADC 32 is coupled to receive an output signal from the low gain signal path (a 'low gain output signal').

Receiver 16 is configured to convert a received optical signals into electrical (analog) signals, amplify the electrical signals, and convert them into a digital format for further processing (e.g., decoding). Electrical currents are induced through photodiode 22 by received optical signals. These electrical currents vary in amplitude depending on the strength of the optical signals received by the photodiode. Generally speaking, an optical signal of high intensity will induce more current through photodiode 22 than an optical signal of a lower intensity. These electrical currents are conveyed from the cathode of photodiode 22 to the inverting input of amplifier A1 in the high gain signal path, and to the cathode of blocking diode 24 in the low gain signal path.

Amplifier A1, in the high gain signal path, is configured to provide high-gain amplification to the electrical signals received from photodiode 22. Broadly speaking, the function of amplifier A1 is to amplify weak signals to a level sufficient for digital conversion and recovery of the information transmitted thereon by a decoder circuit.

Amplifier A2, in the low gain signal path, is configured to provide amplification to electrical signals on its input node (which is the inverting node in this embodiment). The cathode of photodiode 22 is not directly coupled to the inverting input of amplifier A2. Instead, a blocking diode is interposed between photodiode 22 and the inverting input of amplifier A2. The anode of blocking diode 24 is coupled to the inverting input of amplifier A2, while its cathode is coupled to the cathode of photodiode 22. Blocking diode 24 isolates photodiode 22 and amplifier A1 from compensation current flowing through resistor R9.

In the embodiment shown, output signals produced by both the high gain and low gain signal paths are subject to filtering. More particularly, a low pass filter may be placed on the output nodes of each of the high gain and low gain signal paths. After filtering, the output signals from each of these paths is allowed to propagate to the input of its respective ADC 32. Each ADC 32 is configured to convert the electrical signals it receives from analog signals into digital signals. These digital signals may then be conveyed to a decoder or other circuitry for decoding and/or additional processing.

Optical receiver circuit also includes control unit 34, which is coupled to at least one ADC 32 in this embodiment. Control unit 34 is configured to monitor the amplitude of the output signal for at least one of the low and high gain signal paths. The amplitude of the monitored output signal(s) may be determined after conversion to digital format. In one embodiment, the amplitude of the low gain output signal is monitored by observing the level of the digital signals produced the respective ADC 32. The amplitude of the low gain output signal may be determined by observing one or more of the most significant bits (or all of the bits) of its digital equivalent. If the amplitude of the low gain output signal determined during the monitoring falls below a predetermined level, control unit 34 is configured to cause the digital data provided by ADC 32-H to be selected for decoding and any further processing that may be necessary. If the amplitude of the low gain output signal exceeds the predetermined threshold, control unit 34 is configured to cause the digital data provide by ADC 32-L to be selected for decoding/additional processing.

Alternate embodiments wherein the amplitude of the high gain output signal or both output signals is monitored, with the monitoring of such embodiments occurring based on either analog signal levels or signal levels indicated by a digital value subsequent to digital conversion. Embodiments wherein the ADC's of optical receiver 16 are each configured for coupling to separate decoders, with control unit 34 causing the output of one of the separate decoders to be selected based on the amplitude of the monitored output signal(s) are also possible and contemplated.

Optical receiver 16 also includes compensation circuitry (coupled between the high gain signal path and the low gain signal path) and adaptive bias circuitry (coupled between the low gain signal path and the anode of photodiode 22). The compensation circuitry includes amplifier A3 and resistors R3, R5, and R9. The adaptive bias circuitry includes amplifier A4 and resistors R4 and R6. The functionality of both of these circuits will be explained in further detail below.

During its operation, optical receiver 16 may receive optical signals, which are converted into electrical signals by photodiode 22. These electrical signals are received on the inverting input of amplifier A1 and amplified. The output signal of amplifier A1 is conveyed through resistor R7, through filter 28-H, and to ADC 32-H. The amplified signal is also conveyed as feedback to amplifier A1 through resistor RI, and is also conveyed to the inverting input of amplifier A3 through resistor R5.

If the electrical signals produced by photodiode are sufficiently weak (e.g.; small enough such that the amplitude of the high gain output signal is less than a predetermined threshold), then an output signal produced by amplifier A2 will be relatively small. In such a situation, the electrical signals produced by photodiode 22 will be largely or completely blocked from the inverting input of amplifier A2. However, the compensation circuitry may produce an output signal that is provided to the inverting input of amplifier A2, thus ensuring that it remains operating even when the input electrical signals from photodiode 22 are weak. Thus, settling time for amplifiers A1 and A2 that would occur when switching between the low and high gain signal paths are not an issue after the initialization of operations for receiver circuit 16. In one embodiment, the gain of amplifier A3 is set such that the amplitude of the low gain output signal varies in direct proportion to the current through the photodiode, as will be discussed below in reference to FIG. 4B.

When the amplitude of the electrical signals produced by photodiode 22 increases, the amplitude of the high gain output signal will, increase correspondingly up to a certain limit. Limiter 26 is a clamping circuit that will limit the voltage of the high gain output signal to a predetermined maximum. Once this voltage has been reached, no additional current can flow through feedback resistor RI, nor can the voltage amplitude of the high gain output signal increase any further. As the amplitude of the electrical signals produced by photodiode 22 increase beyond this point, any excess current on the high gain signal path is fed to the inverting input of amplifier A3. This in turn will increase the magnitude of the signal on the inverting input of amplifier A2. Blocking diode 24, as noted above, isolates photodiode 22 and the inverting input of amplifier A1 from the compensation current flowing through resistor R9. Accordingly, any additional photodiode current beyond the limit point is absorbed by the low-gain signal path.

As has been previously noted, control unit 34 is configured to select one of the high or low gain signal paths, or more particularly for this embodiment, select an output from either ADC 32-H or ADC 32-L for decoding. Broadly speaking, control unit 34 is configured to select the output of the low gain signal path if the amplitude of one of either the high gain or low gain output signals exceeds a predetermined threshold, or select the output of the high gain signal path if the monitored output signal falls below the predetermined threshold.

In one embodiment, this threshold may be the voltage at which limiter 26 causes the output voltage of the high gain signal path to be limited. In another embodiment, the threshold may be set at a level below the maximum voltage set by limiter 26. In the embodiment shown, control unit 34 monitors the amplitude of the low gain signal path by observing its digital equivalent in ADC 32-L. Since the value of the digital signal produced by each ADC 32 is related to the amplitude of its respective analog input signal, the level of the low gain output signal is readily determined by reading the binary value of the digital signals produced by ADC 32-L. If control unit 34, in reading the binary values of the digital signal produced by ADC 32-L, determines that the amplitude of the low gain output signal exceeds the predetermined threshold, the digital output of ADC 32-L may be selected for decoding and/or further processing in the communications system in which receiver 16 is implemented. Conversely, if control unit 34 determines that the amplitude of the low gain output signal is less than the predetermined threshold, the digital output of ADC 32-H may be selected for decoding/additional processing.

By utilizing separate ADC circuits for each of the low and high gain signal paths and performing the switching function by selecting digital data from either of these circuits, problems induced by switching before this point may be avoided. Many embodiments, including the one shown in FIG. 3, utilize filters to attenuate unwanted portions of the amplified analog signals prior to analog-to-digital conversion. Similar to the amplifiers discussed above, these filters require a settling time. In embodiments where switching between the low and high gain signal paths is performed prior to conversion of their respective output signals to a digital format, this settling time may impede operation of the circuit. This is due to the fact that, similar to the case of the amplifiers discussed above, data from the signal paths is invalid during the settling time of the filters. Thus, by monitoring the relative signal strengths of the low and high gain signal paths after their respective output signals are converted to a digital format and making the selection based thereupon, the need to switch prior to digital conversion, and thus the induction of filter settling, may be avoided.

As previously noted, receiver circuit 16 includes adaptive bias circuitry, which includes amplifier A4 and resistors R4 and R6. The adaptive bias circuitry is configured to provide compensation for DC bias voltages across photodiode 22. The amount of compensation provided is related directly to the amplitude of the low gain output signal, which is provided to the inverting input of amplifier A4 via resistor R6 in this embodiment (it is noted that other embodiments wherein the adaptive bias circuitry is coupled to the high gain signal path are also possible and contemplated). The output of amplifier A4 is coupled directly to the anode of photodiode. Thus, an output signal provided by amplifier A4 will compensate for DC bias across photodiode in proportion to its magnitude, which is determined by the magnitude of the low gain output signal.

Photodiodes such as the one used in this embodiment may be subject to leakage currents even in the absence of an optical signal (i.e. 'dark' currents). These dark currents can affect the linearity of electrical signals produced by the photodiode. Amplifier A4 provides a low bias voltage for low optical signal intensity, greatly reducing dark current errors. Amplifier A4 also provides a large bias voltage for high optical signal intensity for improved linearity.

FIG'S. 4A and 4B are graphs illustrating the output signals of the high and low gain amplifiers, respectively, in terms of voltage as a function of photodiode current. More particularly, these graphs illustrate the output signal response of the high and low gain amplifiers as implemented in optical receiver 16. The responses illustrated herein correspond to the embodiment of the optical receiver circuit 16 discussed above in reference to FIG. 3. Also shown in FIG. 4B, for comparison purposes, is the response of an embodiment lacking the compensation circuitry shown in the embodiment of FIG. 3.

Figure 4B:
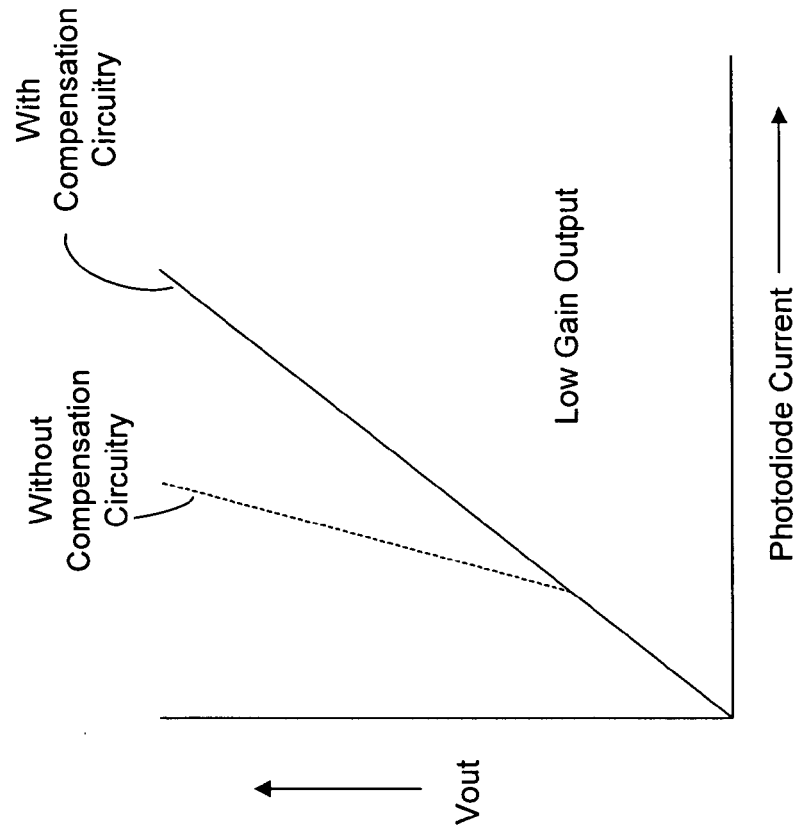
FIG. 4B is a graph illustrating the response of the low gain output signal for one embodiment of an optical receiver circuit, in terms of voltage vs. photodiode current.
Figure 4A:
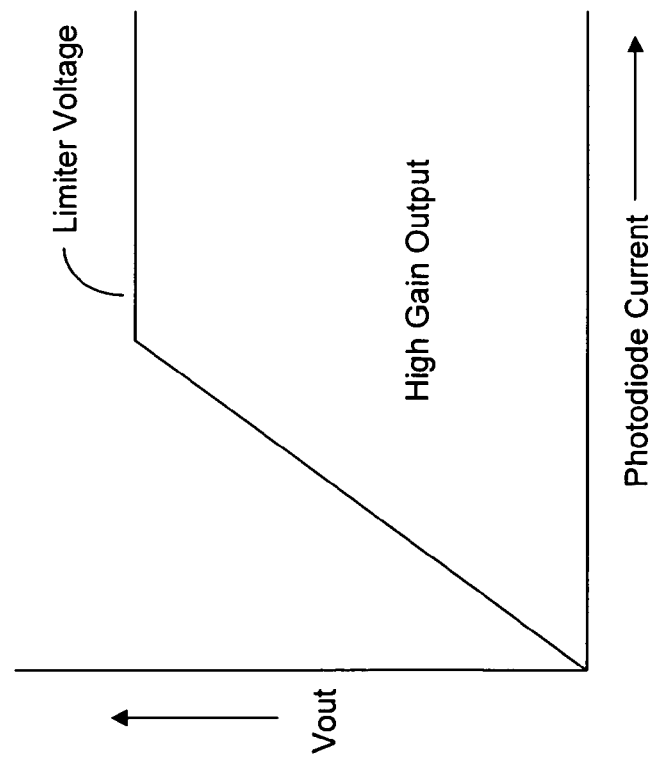
FIG. 4A is a graph illustrating the response of the high gain output signal for one embodiment of an optical receiver circuit, in terms of voltage vs. photodiode current.

Turning now to FIG. 4A is a graph illustrating the response of the high gain output signal is shown. As illustrated in the graph, the voltage of the high gain output signal will vary in proportion to the photodiode current between zero and the point at which the photodiode current causes the high gain output signal to reach its limit set by the limiter circuit. Once the voltage limit set by the limiter circuit is reached, the response remains flat even as photodiode current increases. Referring back to FIG. 3, no additional current will flow through feedback resistor RI once the voltage limit has been reached.

The graph of FIG. 4B illustrates the response of the low gain output signal for the embodiment of FIG. 3 and further illustrates the effect of the compensation circuitry. As shown in the graph, the low gain output signal will vary in proportion to the increase in the photodiode current, limited only by the maximum amount of current that can be produced by the photodiode and the operating limits of the low gain amplifier. The circuit may be designed such that the slope of the response of the low gain output signal is equivalent to that of the high gain output signal prior to reaching the limit point. The use of compensation circuitry as shown in FIG. 3 may guarantee that these slopes are equivalent. This is in contrast to the response of an embodiment without compensation circuitry, as shown by the designated dashed line in the graph.

Without compensation circuitry, a breakpoint exists in the response of the low gain output signal. Since there is no compensation circuitry in such an embodiment, the low gain output response is entirely dependent on photodiode current. When the photodiode current is such that the circuit is operating above the operating point set by the limiting circuit in the high gain signal path, the slope of the low gain output signal response will be steeper than when the circuit is operating below this point. This is due to the fact that, without compensation circuitry, both voltage and current will be limited in the high gain signal path.

As previously noted, when the voltage limit set by the limiter circuit is reached, no additional current will flow through the feedback resistor for the amplifier in the high gain signal path (A1 in FIG. 3). Excess photodiode current (i.e. after the limit point is reached) is source to the inverting input of the amplifier in the low gain signal path (A2 in FIG. 3). In embodiments without the compensation circuitry shown in FIG. 3, the slope of the low gain output response is greater above the limit point than below. Accordingly, without compensation circuitry, the low gain output response is not predictable since the slope of this response varies with photodiode current. In contrast, a correction term is provided by the compensation circuitry to the low gain signal path for the embodiment of FIG. 3, resulting in a steady slope and a predictable relationship between photodiode current and the voltage of the low gain output signal. This predictable relationship is essential in making accurate decisions in control block 31.

While the present invention has been described with reference to particular embodiments, it will be understood that the embodiments are illustrative and that the invention scope is not so limited. Any variations, modifications, additions, and improvements to the embodiments described are possible. These variations, modifications, additions, and improvements may fall within the scope of the inventions as detailed within the following claims.

What is claimed is:

1. An optical receiver comprising:
a photodiode configured to convert received optical signals into electrical signals;
a high gain signal path electrically coupled to the photodiode, wherein the high gain signal path is configured to provide a high gain output signal;
a low gain signal path electrically coupled to the photodiode, wherein the low gain signal path is configured to provide a low gain output signal;
first analog-to-digital conversion (ADC) circuitry coupled to the high gain signal path;
second ADC circuitry coupled to the low gain signal path;
a control unit, wherein the control unit is configured to monitor at least one of the low gain or high gain output signals and further configured to select data provided by the first ADC circuitry if an amplitude of the at least one of the low gain and high gain output signals falls below a predetermined threshold; and
a blocking diode coupled between the photodiode and the low gain signal path, wherein a cathode of the blocking diode is coupled to a cathode of the photodiode, and wherein an anode of the blocking diode is coupled to an input to the second amplifier.

2. The optical receiver as recited in claim 1, wherein the control unit is configured to determine the amplitude of the low gain output signal by monitoring the second ADC circuitry.

3. The optical receiver as recited in claim 1, wherein the high gain signal path includes a high gain amplifier and wherein the low gain signal path includes a low gain amplifier.

4. The optical receiver as recited in claim 1 further comprising an adaptive bias circuit wherein the adaptive bias circuit includes a bias amplifier, and wherein the adaptive bias circuit is configured to adjust a DC bias across the photodiode based on the amplitude of the low gain output signal.

5. The optical receiver as recited in claim 1 further comprising a compensation circuit coupled between an output of the high gain signal path the low gain signal path, wherein the compensation circuit is configured to cause the amplitude of the low gain output signal to vary in direct proportion to a current through the photodiode.

6. The optical receiver as recited in claim 1 further comprising a limiting circuit coupled between an output of the high gain signal path and a ground node, wherein the limiting circuit is configured to limit an amplitude of the high gain output signal.

7. The optical receiver as recited in claim 1, wherein the control unit is configured to select data provided by the second ADC circuitry if the amplitude of the at least one of the low gain and high gain output signals exceeds the predetermined threshold.

8. The optical receiver as recited in claim 7, wherein data selected from either the first ADC or the second ADC is provided to a decoder configured to decode the data.

9. The optical receiver as recited in claim 1 further comprising a first filter coupled between an output of the high gain signal path and the first ADC circuitry and a second filter coupled between an output of the low gain signal path and the second ADC circuitry.

10. A method of operating an optical receiver, the method comprising:
receiving an optical signal;
converting the optical signal into an electrical signal;
providing the electrical signal to a low gain signal path and a high gain signal path;
converting a high gain output signal from the high gain signal path into a first plurality of digital signals;
converting a low gain output signal from the low gain signal path into a second plurality of digital signals;
monitoring an amplitude of at least one of the low gain output signal and high gain output signal;
selecting data carried on high gain output signal if the amplitude of the one of the low gain output signal or high gain output signal falls below a predetermined threshold; and blocking at least a portion of the electrical signal from reaching the low gain signal path using a blocking diode.

11. The method as recited in claim 10 further comprising determining the amplitude of the low gain output signal path by monitoring the second plurality of digital signals.

12. The method as recited in claim 10 further comprising amplifying the electrical signal in the high gain signal path with a high gain amplifier and amplifying the electrical signal in the low gain signal path with a low gain amplifier.

13. The method as recited in claim 11 further comprising adjusting a DC bias across the photo diode based on the amplitude of the low gain output signal.

14. The method as recited in claim 11 further comprising providing a compensation signal to the low gain signal path, wherein the compensation signal causes the amplitude of the low gain output signal to vary in direct proportion to a current across the photodiode.

15. The method as recited in claim 11 further comprising limiting an amplitude of the high gain output signal without slope change.

16. The method as recited in claim 11, wherein selecting the high gain output signal comprises selecting the first plurality of digital signals, and wherein the method further comprises selecting the low gain output signal by selecting the second plurality of digital signals if the amplitude of the one the at least one of the low gain and high gain output signals exceeds the predetermined threshold.

17. The method as recited in claim 10 further comprising decoding data carried on a selected one of the high gain or low gain output signals.

18. The method as recited in claim 11 further comprising filtering the high gain output signal and the low gain output signal prior to converting the high gain output signal to the first plurality of digital signals and the low gain output signal to the second plurality of digital signals.

* * * * *